(12) United States Patent
Hill et al.

(10) Patent No.: US 10,086,668 B2
(45) Date of Patent: Oct. 2, 2018

(54) DYNAMICALLY ADJUSTABLE BODY MOUNTS FOR A MOTOR VEHICLE

(71) Applicant: GM GLOBAL TECHNOLOGY OPERATIONS LLC, Detroit, MI (US)

(72) Inventors: Wallace J. Hill, Commerce Township, MI (US); Mark A. Gehringer, Milford, MI (US); Michael E. McGuire, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/444,681

(22) Filed: Feb. 28, 2017

(65) Prior Publication Data

US 2018/0244124 A1 Aug. 30, 2018

(51) Int. Cl.
*B60G 17/015* (2006.01)
*B60G 17/016* (2006.01)
*B60G 17/0165* (2006.01)

(52) U.S. Cl.
CPC ....... *B60G 17/016* (2013.01); *B60G 17/0162* (2013.01); *B60G 17/0164* (2013.01); *B60G 17/0165* (2013.01); *B60G 2204/62* (2013.01); *B60G 2400/0523* (2013.01); *B60G 2400/204* (2013.01); *B60G 2400/412* (2013.01); *B60G 2400/82* (2013.01); *B60G 2400/98* (2013.01); *B60G 2500/10* (2013.01); *B60G 2600/18* (2013.01); *B60G 2600/44* (2013.01)

(58) Field of Classification Search
CPC .............. B60G 17/016; B60G 17/0162; B60G 17/0164; B60G 17/0165; B60G 2204/62; B60G 2400/0523; B60G 2400/204; B60G 2400/412
USPC .......................................................... 701/37
See application file for complete search history.

(56) References Cited

U.S. PATENT DOCUMENTS

2017/0137023 A1* 5/2017 Anderson ............. B60W 30/02

* cited by examiner

*Primary Examiner* — Gertrude Arthur Jeanglaude

(57) ABSTRACT

A vehicle includes a chassis and a vehicle body supported by the chassis. At least one dynamically adjustable body mount connects the vehicle body to the chassis. The at least one dynamically adjustable body mount includes a selectively adjustable parameter. One or more vehicle sensors is associated with the vehicle. The one or more vehicle sensors is operable to detect one or more vehicle parameters. A control system is operatively connected to the at least one dynamically adjustable body mount and the one or more vehicle sensors. The control system is operable to alter the selectively adjustable parameter of the at least one dynamically adjustable body mount to substantially isolate the body from road and vehicle induced vibration in response to at least one of the one or more vehicle parameters and the one or more road surface parameters.

20 Claims, 2 Drawing Sheets

DYNAMICALLY ADJUSTABLE BODY MOUNTS FOR A MOTOR VEHICLE

INTRODUCTION

The present invention relates generally to the field of vehicles and, more specifically, to dynamically adjustable body mounts for a motor vehicle.

Many vehicles include body mounts to reduce the effects of noise, vibration, and harshness (NVH) transmitted to the vehicle operator and/or passengers. The body mount serves a dual purpose of connecting the body and the chassis while also absorbing the stresses of operation. The mount provides a more comfortable ride and prevents unnecessary stress to the connection provided by the fasteners. However, body mounts are also designed to provide ride and handling characteristics and isolate the body from powertrain, chassis and driveline NVH disturbances. Tradeoffs occur between the use of stiff rubber compounds and increased damping, which improve ride and handling and structural feel of the vehicle, versus the use of softer rubber compounds, which improve isolation. Accordingly, it is desirable to provide a system that may improve handling, structural feel, and isolation feel of the vehicle for a given operation.

SUMMARY

Embodiments according to the present disclosure provide a number of advantages. For example, embodiments according to the present disclosure enable active adjustment of a dynamically adjustable body mount based on one or more vehicle and road conditions to both reduce the transmission of vibrations to the body from the chassis and retain desired vehicle handling. The term "body mount" as used herein encompasses frame and sub-frame to body mounts.

In one aspect, a method for isolating a vehicle body from a vehicle chassis includes the steps of detecting a first parameter of a road surface, detecting a second parameter of a vehicle, adjusting a selectively adjustable parameter of at least one dynamically adjustable body mount operatively connecting the vehicle chassis to the vehicle body based on one or more of the first parameter and the second parameter, and limiting transmission of noise and vibration from the vehicle chassis to the vehicle body through the at least one dynamically adjustable body mount.

In some aspects, detecting the first parameter includes detecting a road surface texture. In some aspects, detecting the second parameter includes detecting at least one of a predetermined speed, a predetermined steering wheel angle, and a wheel displacement of the vehicle.

In some aspects, adjusting the selectively adjustable parameter includes selectively adjusting at least one of a stiffness parameter and a damping parameter of the at least one dynamically adjustable body mount.

In some aspects, the method further includes the steps of monitoring at least one vehicle sensor, detecting a trigger condition, and reverting the at least one dynamically adjustable body mount to a default tuning characteristic of the at least one dynamically adjustable body mount following detection of the trigger condition.

In some aspects, the trigger condition includes one or more of a vehicle speed, a steering angle change threshold, a body roll threshold, a suspension displacement threshold, and a road surface condition threshold.

In another aspect, an automotive vehicle includes a chassis, a vehicle body, at least one dynamically adjustable body mount connecting the vehicle body to the chassis, the at least one dynamically adjustable body mount including a selectively adjustable parameter, one or more vehicle sensors associated with the vehicle, the one or more vehicle sensors being operable to detect one or more vehicle parameters, one or more road condition sensors associated with the vehicle, the one or more road condition sensors being operable to detect one or more road surface parameters, and a control system operatively connected to the at least one dynamically adjustable body mount, the one or more vehicle sensors, and the one or more road condition sensors, the control system being operable to alter the selectively adjustable parameter of the at least one dynamically adjustable body mount to substantially isolate the body from road and vehicle induced vibration in response to at least one of the one or more vehicle parameters and the one or more road surface parameters.

In some aspects, the selectively adjustable parameter includes at least one of a stiffness parameter and a damping parameter.

In some aspects, the one or more vehicle parameters includes one or more of a vehicle speed, a vehicle speed rate-of-change, a steering wheel position, a steering wheel position rate of change, a body roll condition, a body yaw condition, a suspension displacement, and a wheel displacement.

In some aspects, the one or more road surface parameters includes a road surface texture.

In some aspects, the at least one dynamically adjustable body mount includes a default tuning characteristic, the control system being operable to revert to the default tuning characteristic following a detection of a trigger condition.

In some aspects, the trigger condition includes one or more of a vehicle speed, a steering angle change threshold, a body roll threshold, a suspension displacement threshold, and a road surface condition threshold.

In some aspects, the at least one dynamically adjustable body mount is configured to limit transmission of one or more of a road induced noise and vibration, a powertrain induced noise and vibration, and a driveline induced noise and vibration to the body.

In yet another aspect, a system for isolating a vehicle body from a vehicle chassis includes at least one dynamically adjustable body mount, the at least one dynamically adjustable body mount including a selectively adjustable parameter, one or more vehicle sensors, the one or more vehicle sensors being operable to detect one or more parameters, and a control system operatively connected to the at least one dynamically adjustable body mount and the one or more vehicle sensors, the control system being operable to alter the selectively adjustable parameter of the at least one dynamically adjustable body mount to substantially isolate the body from road and vehicle induced vibration in response to at least one of the one or more parameters.

In some aspects, the selectively adjustable parameter includes at least one of a stiffness parameter, and a damping parameter.

In some aspects, the one or more parameters includes one or more of a vehicle speed, a vehicle speed rate-of-change, a steering wheel position, a steering wheel position rate-of-change, a wheel displacement, and a suspension displacement.

In some aspects, the one or more road surface parameters includes a road surface texture.

In some aspects, the at least one dynamically adjustable body mount includes a default tuning characteristic, the control system being operable to revert to the default tuning characteristic following a detection of a trigger condition.

In some aspects, the trigger condition includes one or more of a vehicle speed, a steering angle change threshold, a body roll threshold, a suspension displacement threshold, and a road surface condition threshold.

In some aspects, the at least one dynamically adjustable body mount limits transmission of road induced noise and vibration, powertrain induced noise and vibration, and driveline induced noise and vibration to the body.

BRIEF DESCRIPTION OF THE DRAWINGS

The present disclosure will be described in conjunction with the following figures, wherein like numerals denote like elements.

Figure 1:
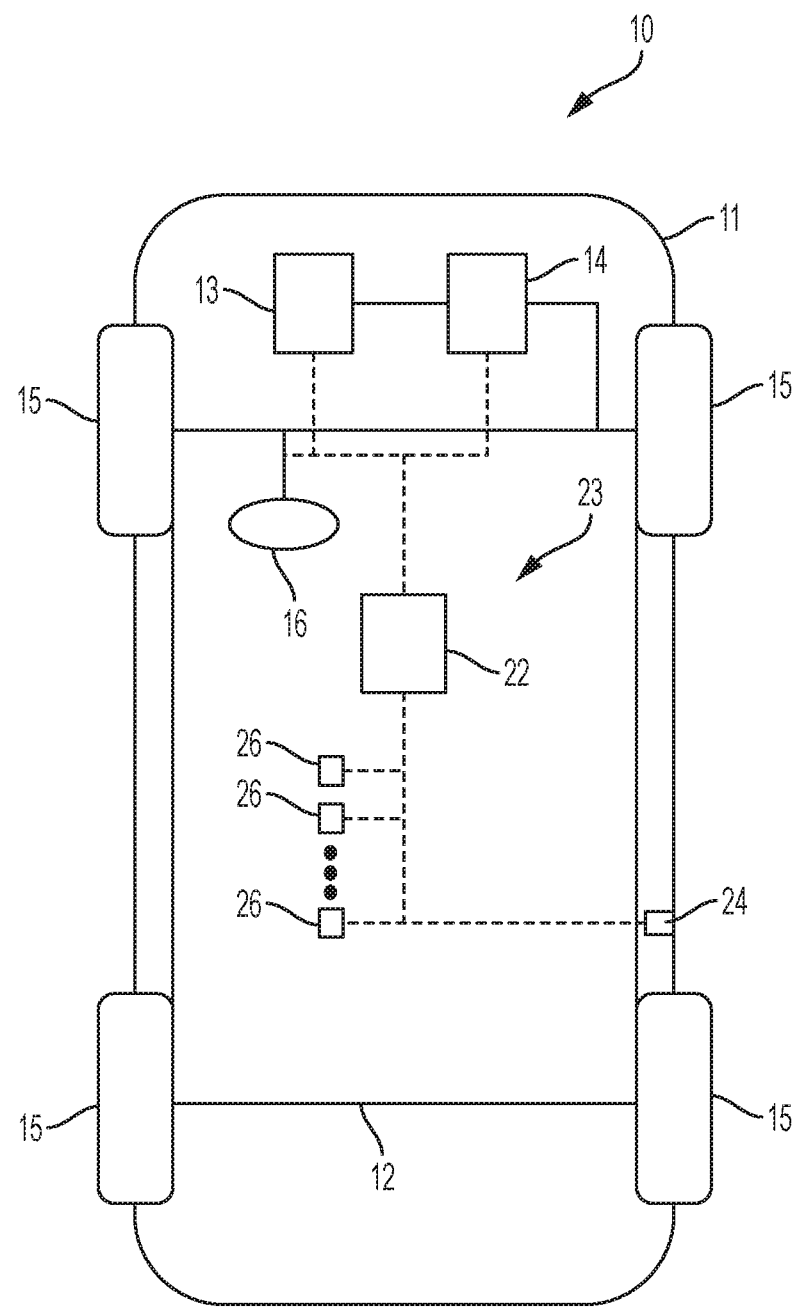
FIG. 1 is a schematic representation of a vehicle including a dynamically adjustable body mount, in accordance with an exemplary embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Bi-state or switchable cab or body mounts, such as the embodiments discussed below, enable controllable stiffness and damping to reduce the effects of vibrations caused by driveline components, the powertrain, road surface textures and tires while retaining desired vehicle handling. Targeted control of switchable body mounts such as the embodiments discussed below, using a control system, provides both vehicle dynamics and NVH benefits. Additionally, in some embodiments, including the embodiments discussed below, the control system in combination with at least one dynamically adjusted body mount, provides additional tuning capabilities applicable to multiple degrees of freedom at each mount location.

FIG. 1 schematically illustrates an automotive vehicle 10 according to the present disclosure. The vehicle 10 generally includes a body 11, a chassis 12, and wheels 15. The body 11 is arranged on the chassis 12 and substantially encloses the other components of the vehicle 10. The body 11 and chassis 12 may jointly form a frame. The wheels 15 are each rotationally coupled to the chassis 12 near a respective corner of the body 11. The vehicle 10 is depicted in the illustrated embodiment as a passenger car, but it should be appreciated that any other vehicle including trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. The vehicle 10 additionally includes a steering system 16 including, in some embodiments, a steering wheel.

With further reference to FIG. 1, the vehicle 10 also includes a sensing system including a plurality of sensors 26 configured to measure and capture data on one or more vehicle characteristics, including but not limited to vehicle speed, vehicle heading, wheel speed, and wheel displacement. In the illustrated embodiment, the sensors 26 include, but are not limited to, an accelerometer, a speed sensor, a steering wheel angle sensor, wheel displacement sensor, or other sensors that sense observable conditions of the vehicle or the environment surrounding the vehicle and may include RADAR, LIDAR, optical cameras, thermal cameras, ultrasonic sensors, and/or additional sensors as appropriate.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle. In some embodiments, the controller 22 is an engine control module (ECM). In some embodiments, the controller 22 is a body control module (BCM).

Together with one or more of the sensors 26, the controller 22 forms a control system 23 operatively connected to at least one dynamically adjustable body mount 24. The dynamically adjustable body mount 24 includes a body mount that incorporates the features of one or more of a shear mount, a hydraulic mount, and a compression mount to provide optimized stiffness and damping depending on the vehicle and/or road surface condition. In some embodiments, the dynamically adjustable body mount 24 is a bi-state mount or hydraulic solenoid. In some embodiments, the body mount 24 is a multi-state mount. In other embodiments, the body mount 24 is a continuously-variable mount. In some embodiments, the body mount 24 includes one or more adjustment mechanisms including, for example and without limitation, piezo-electric, mechanical, shape memory alloys, vacuum-actuation, and pneumatic-actuation. However, any electronically-controllable adjustment mechanism for a body mount understood by one of skill in the art may be used.

In an exemplary embodiment, the control system 23 selectively adjusts one or more of the damping parameter and the stiffness parameter of the at least one dynamically adjustable body mount 24 to limit transmission of one or more of a road induced noise and vibration, a powertrain induced noise and vibration, and a driveline induced noise and vibration to the vehicle body and achieve an isolation feel to the vehicle as a result of the selected stiffness and damping characteristics of the body mount 24. More specifically, each dynamically adjustable body mount 24 includes a default tuning characteristic that limits the transmission of vibrations from the vehicle chassis 12 to the vehicle body 11 during normal driving conditions and retains desired vehicle handling. The default tuning characteristic may be selectively adjusted to further reduce boom noise from active fuel management (AFM), road induced vibration, tire induced vibration, and driveline induced vibrations. In some embodiments, the control system 23, through the at least one dynamically adjustable body mount 24, controls force transmission between the chassis 12 and the body 11 to retain desired vehicle handling and minimize the effects of noise and vibration. In some embodiments, the mount 24 is tuned or calibrated to provide improved vehicle handling and minimized noise and vibration effects during towing or loaded conditions.

Figure 2:
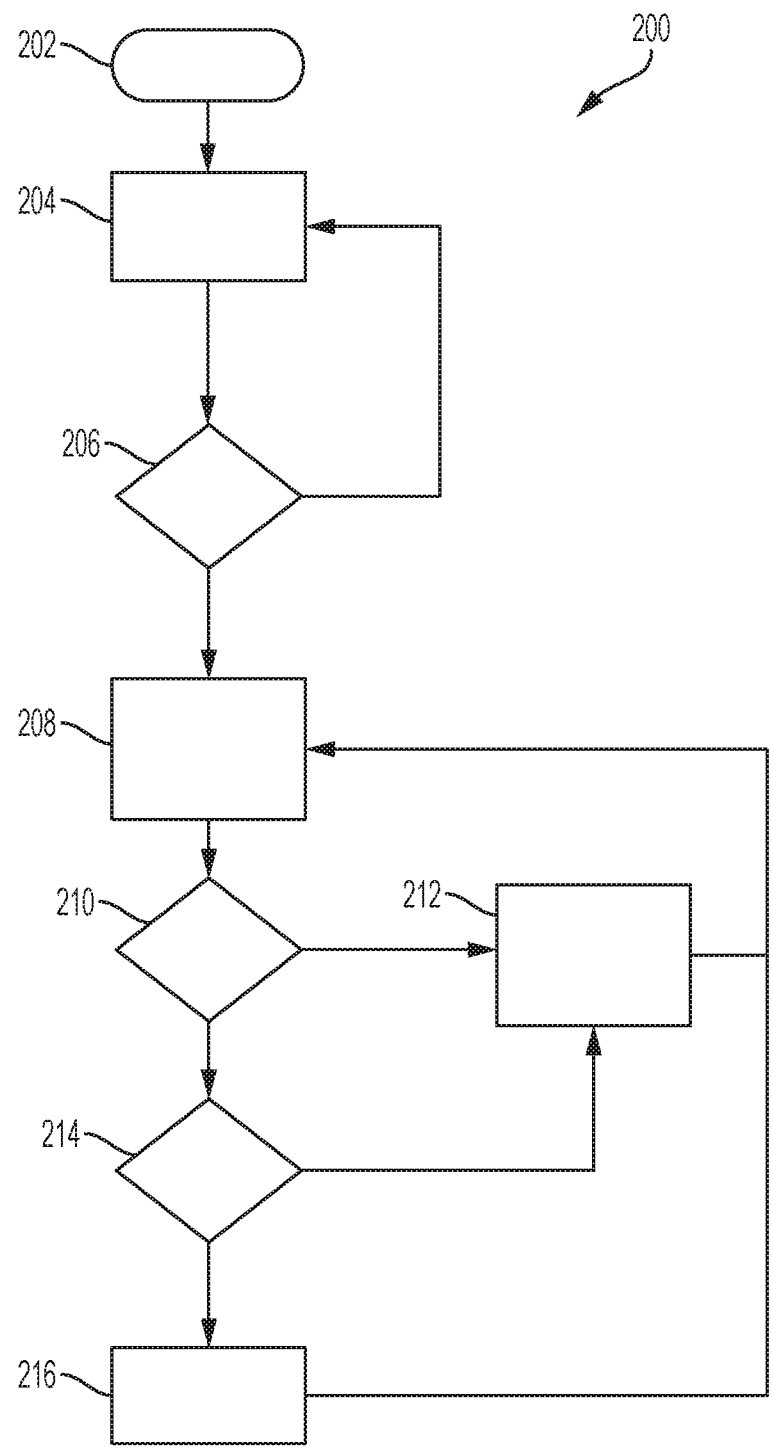
FIG. 2 is a flow diagram of a method to actively adjust a dynamically adjustable body mount, according to an embodiment.

FIG. 2 illustrates a method 200 of reducing noise and vibration transmission from the chassis 12 to the body 11 while retaining desired vehicle handling using at least one dynamically adjustable body mount 24. The method 200 can be utilized in connection with the vehicle 10, the control system 23 including controller 22, the sensors 26, and the at least one dynamically adjustable body mount 24, in accordance with exemplary embodiments. The order of operation within the method 200 is not limited to the sequential execution as illustrated in FIG. 2, but may be performed in one or more varying orders as applicable and in accordance with the present disclosure.

Starting at 202, the method 200 proceeds to 204. At 204, the dynamically adjustable body mount 24 receives a control signal generated by the control system 23 directing adjustment of the body mount 24 to a default tuning characteristic or setting. The default setting is, in some embodiments, a softness setting to optimize noise and vibration isolation. The default setting includes, in some embodiments, a setting for one or more of the stiffness and damping properties of the dynamically adjustable mount 24. In some embodiments, the default setting depends on the size and weight of the vehicle 10.

Next, at 206, the control system 23 determines whether the vehicle 10 is in idle. To determine if the vehicle 10 is in idle, the control system 23 receives data from one or more of the sensors 26, which may include an engine speed sensor or a gear shift indicator. If the control system 23 determines that the vehicle 10 is in idle, such as, for example and without limitation, the data indicates that the engine speed is below a predetermined threshold, the method 200 returns to 204, where the default setting of the dynamically adjustable body mount 24 is set or maintained. If the control system 23 determines that the vehicle 10 is not in idle, such as, for example and without limitation, the engine speed is above a predetermined threshold, the method proceeds to 208 and the control system 23 receives vehicle parameter data from one or more of the sensors 26 including, for example and without limitation, data regarding wheel speed, steering wheel angle, and wheel displacement. The control system 23 monitors the data received from one or more of the sensors 26 and uses the sensor data to determine vehicle and road surface parameters including one or more of the vehicle speed, a vehicle speed rate-of-change, a steering wheel position, a steering wheel position rate-of-change, steering angle, a body roll condition, a body yaw condition, a wheel displacement, road surface texture, chassis control mode switching (i.e. tow mode or tour mode/handling modes), and suspension displacement, for example and without limitation.

While continuing to review and monitor the sensor data, the method 200 proceeds to 210. At 210, the control system 23 determines whether one or more trigger conditions including, for example and without limitation, the road surface texture or condition, the vehicle speed, body roll, chassis control mode, and the suspension displacement, is above or below a predetermined threshold based on the sensor data received from one or more of the sensors 26. The predetermined threshold may be based on the size and weight of the vehicle, among other factors. In some embodiments, for example and without limitation, the predetermined threshold is a wheel displacement threshold or a wheel speed threshold. If the control system 23 determines from the sensor data that the trigger condition is above the predetermined threshold, the method 200 proceeds to 212.

At 212, the control system 23 generates a control signal directing the dynamically adjustable body mount 24 to adjust to a firm setting, that is, a setting that has a stiffness greater than the default setting established at 204. The firm setting is, in some embodiments, a firm setting in one or both of the lateral and vertical directions to optimize handling and structural feel of the vehicle based on the detected road surface condition. The firm setting includes, in some embodiments, a setting for one or more of the stiffness and damping properties of the dynamically adjustable mount 24. The method 200 then returns to 208 and the control system 23 continues to receive and monitor the data from one or more of the sensors 26 including, for example and without limitation, data regarding wheel speed, steering wheel angle, and wheel displacement.

If, at 210, the control system 23 determines from the sensor data that the road surface condition is below the predetermined threshold, the method 200 proceeds to 214. At 214, the control system 23 determines from the sensor data whether a trigger condition, such as, for example and without limitation, a steering angle change, is above or below a predetermined threshold. While the actual steering angle threshold varies depending on the vehicle architecture and steering variables, in some embodiments, for example and without limitation, the steering angle change threshold is approximately 20 degrees, approximately 30 degrees, or approximately 45 degrees. In some embodiments, steering wheel angle thresholds are tunable based on the architecture of the vehicle 10 among other factors. The steering angle change is defined as a change in steering angle from the steering angle measured or detected at a first time to the steering angle measured or detected at a second time that occurs a predetermined time interval after the first time. In some embodiments, the steering angle is measured by a steering wheel angle sensor, one of the sensors 26.

If the steering angle change detected or measured at 214 is above the predetermined threshold, the method 200 proceeds to 212. As discussed above, at 212, the control system 23 generates a control signal directing the dynamically adjustable body mount 24 to adjust to a firm setting, that is, a setting that has a stiffness greater than the default setting established at 204. The firm setting is, in some embodiments, a firm setting in one or both of the lateral and vertical directions to optimize handling and structural feel of the vehicle based on the detected road surface condition. The firm setting includes, in some embodiments, a setting for one or more of the stiffness, damping, and isolation properties of the dynamically adjustable mount 24. The method 200 then returns to 208 and the control system 23 continues to receive and monitor the data from one or more of the sensors 26 including, for example and without limitation, data regarding wheel speed, steering wheel angle, and wheel displacement.

If the steering angle change detected or measured at 214 is below the predetermined threshold, the method 200 proceeds to 216. At 216, the control system 23 generates a control signal directing the dynamically adjustable body mount 24 to adjust to a soft setting, that is, a setting that has a stiffness less than the firm setting established at 212. The soft setting resulting from the control signal generated by the control system 23 at 216 may be the same or different from the soft setting established as the default setting at 204. The soft setting includes, in some embodiments, a setting for one or more of the stiffness and damping properties of the dynamically adjustable mount 24. The method 200 then returns to 208 and the control system 23 continues to receive and monitor the data from one or more of the sensors 26.

Exemplary embodiments, such as those discussed herein, provide a system for enabling high stiffness and damping settings of the dynamically adjustable body mount to reduce freeway hop and retain desired handling and enabling lower stiffness settings of the dynamically adjustable body mount to limit the transmission of road, tire, and vehicle induced vibrations. Enabling high stiffness and damping settings under specified conditions and lower stiffness settings under other, specified conditions may improve customer satisfaction and lower maintenance requests. By dynamically adjusting the body mount settings based on driving conditions, the exemplary embodiments enhance an overall customer satisfaction factor as well as improve a customer's driving experience. In some embodiments, the exemplary embodiments, such as those discussed herein, provide a rapid response from the adjustable body mount to a single event such as a change in road condition or texture. The embodiments discussed herein provide dynamic adjustment of a body mount for various vehicle driving conditions such as steady state type driving and consistent driving profiles as well as rapid response dynamic maneuvers.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3." "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for isolating a vehicle body from a vehicle chassis, comprising:
    detecting a first parameter of a road surface;
    detecting a second parameter of a vehicle;
    providing a dynamically adjustable body mount operatively connected to the vehicle body and the vehicle chassis, the adjustable body mount comprising one of a bi-state mount, a multi-state mount, and a continuously-variable mount, the adjustable body mount including one or more electronically-controllable adjustment mechanisms including a piezo-electric mechanism, a shape memory alloy mechanism, a vacuum-actuation mechanism, and a pneumatic-actuation mechanism;
    adjusting a selectively adjustable parameter of the adjustable body mount based on one or more of the first parameter and the second parameter; and
    limiting transmission of noise and vibration from the vehicle chassis to the vehicle body through the at least one dynamically adjustable body mount.

2. The method of claim 1, wherein detecting the first parameter includes detecting a road surface texture.

3. The method of claim 1, wherein detecting the second parameter includes detecting at least one of a predetermined speed, a predetermined steering wheel angle, and a wheel displacement of the vehicle.

4. The method of claim 1, wherein adjusting the selectively adjustable parameter includes selectively adjusting at least one of a stiffness parameter and a damping parameter of the adjustable body mount.

5. The method of claim 1, further comprising:
    monitoring at least one vehicle sensor;
    detecting a trigger condition; and
    reverting the adjustable body mount to a default tuning characteristic of the at least one dynamically adjustable body mount following detection of the trigger condition.

6. The method of claim 5, wherein the trigger condition comprises one or more of a vehicle speed, a steering angle change threshold, a body roll threshold, a suspension displacement threshold, and a road surface condition threshold.

7. An automotive vehicle, comprising:
    a chassis;
    a vehicle body;
    a dynamically adjustable body mount connecting the vehicle body to the chassis, the dynamically adjustable body mount including a selectively adjustable parameter, the adjustable body mount comprising one of a bi-state mount, a multi-state mount, and a continuously-variable mount, the adjustable body mount including one or more electronically-controllable adjustment mechanisms including a piezo-electric mechanism, a shape memory alloy mechanism, a vacuum-actuation mechanism, and a pneumatic-actuation mechanism;

one or more vehicle sensors associated with the vehicle, the one or more vehicle sensors being operable to detect one or more vehicle parameters;

one or more road condition sensors associated with the vehicle, the one or more road condition sensors being operable to detect one or more road surface parameters; and a control system operatively connected to the dynamically adjustable body mount, the one or more vehicle sensors, and the one or more road condition sensors, the control system being operable to alter the selectively adjustable parameter of the dynamically adjustable body mount to substantially isolate the body from road and vehicle induced vibration in response to at least one of the one or more vehicle parameters and the one or more road surface parameters.

8. The vehicle of claim 7, wherein the selectively adjustable parameter includes at least one of a stiffness parameter and a damping parameter.

9. The vehicle of claim 7, wherein the one or more vehicle parameters includes one or more of a vehicle speed, a vehicle speed rate-of-change, a steering wheel position, a steering wheel position rate of change, a body roll condition, a body yaw condition, a suspension displacement, and a wheel displacement.

10. The vehicle of claim 7, wherein the one or more road surface parameters includes a road surface texture.

11. The vehicle of claim 7, wherein the at least one dynamically adjustable body mount includes a default tuning characteristic, the control system being operable to revert to the default tuning characteristic following a detection of a trigger condition.

12. The vehicle of claim 11, wherein the trigger condition comprises one or more of a vehicle speed, a steering angle change threshold, a body roll threshold, a suspension displacement threshold, and a road surface condition threshold.

13. The vehicle of claim 7, wherein the at least one dynamically adjustable body mount is configured to limit transmission of one or more of a road induced noise and vibration, a powertrain induced noise and vibration, and a driveline induced noise and vibration to the body.

14. A system for isolating a vehicle body from a vehicle chassis, comprising:

a dynamically adjustable body mount, the dynamically adjustable body mount including a selectively adjustable parameter, the adjustable body mount comprising one of a bi-state mount, a multi-state mount, and a continuously-variable mount, the adjustable body mount including one or more electronically-controllable adjustment mechanisms including a piezo-electric mechanism, a shape memory alloy mechanism, a vacuum-actuation mechanism, and a pneumatic-actuation mechanism;

one or more vehicle sensors, the one or more vehicle sensors being operable to detect one or more parameters; and a control system operatively connected to the dynamically adjustable body mount and the one or more vehicle sensors, the control system being operable to alter the selectively adjustable parameter of the dynamically adjustable body mount to substantially isolate the body from road and vehicle induced vibration in response to at least one of the one or more parameters.

15. The system of claim 14, wherein the selectively adjustable parameter includes at least one of a stiffness parameter, and a damping parameter.

16. The system of claim 14, wherein the one or more parameters includes one or more of a vehicle speed, a vehicle speed rate-of-change, a steering wheel position, a steering wheel position rate-of-change, a wheel displacement, and a suspension displacement.

17. The system of claim 14, wherein the one or more road surface parameters includes a road surface texture.

18. The system of claim 14, wherein the dynamically adjustable body mount includes a default tuning characteristic, the control system being operable to revert to the default tuning characteristic following a detection of a trigger condition.

19. The system of claim 18, wherein the trigger condition comprises one or more of a vehicle speed, a steering angle change threshold, a body roll threshold, a suspension displacement threshold, and a road surface condition threshold.

20. The system of claim 14, wherein the dynamically adjustable body mount limits transmission of road induced noise and vibration, powertrain induced noise and vibration, and driveline induced noise and vibration to the body.

* * * * *